United States Patent [19]

Ballu

[11] Patent Number: 4,473,188
[45] Date of Patent: Sep. 25, 1984

[54] MACHINE FOR SPRAYING A TREATMENT LIQUID, ESPECIALLY FOR THE TREATMENT OF PLANTS AND SOILS

[75] Inventor: Patrick Ballu, Reims, France
[73] Assignee: Tecnoma, Epernay, France
[21] Appl. No.: 576,810
[22] Filed: Feb. 7, 1984

Related U.S. Application Data

[63] Continuation of Ser. No. 293,128, Aug. 17, 1971, abandoned.

[30] Foreign Application Priority Data

Jan. 6, 1981 [FR] France ............................ 81 00089

[51] Int. Cl.³ .............................................. B05B 1/28
[52] U.S. Cl. ................................... 239/121; 239/157; 239/223
[58] Field of Search ............... 239/223, 224, 124, 120, 239/121, 122, 160, 156, 157

[56] References Cited

U.S. PATENT DOCUMENTS 3,590,503  7/1971  Swenson .
3,807,605  4/1974  Meharry et al. ................. 239/156 X
3,994,438  11/1976 Farmery ......................... 239/223 X
4,193,547  3/1980  Ballu .................................. 239/156

FOREIGN PATENT DOCUMENTS 1022969 12/1977 Canada .
1501610 11/1966 France .
2281174  3/1976 France .
2327822  5/1977 France .
2403733  4/1979 France .
1504868  3/1978 United Kingdom .

Primary Examiner—John J. Love
Assistant Examiner—Mary F. McCarthy
Attorney, Agent, or Firm—Watson, Cole, Grindle & Watson

[57] ABSTRACT

A machine for spraying a liquid for the treatment of plants and soils includes a nozzle fed by a pump and a pipe. The nozzle projects the liquid to be sprayed against the central portion of a rotary thrower. A collector in the form of a sector of a ring is fixed along the periphery of the rotary thrower without contact with it, so as to intercept the liquid projected except within an angle θ. The liquid intercepted by the collector is collected in a receiver and returned to the tank of the machine.

15 Claims, 7 Drawing Figures

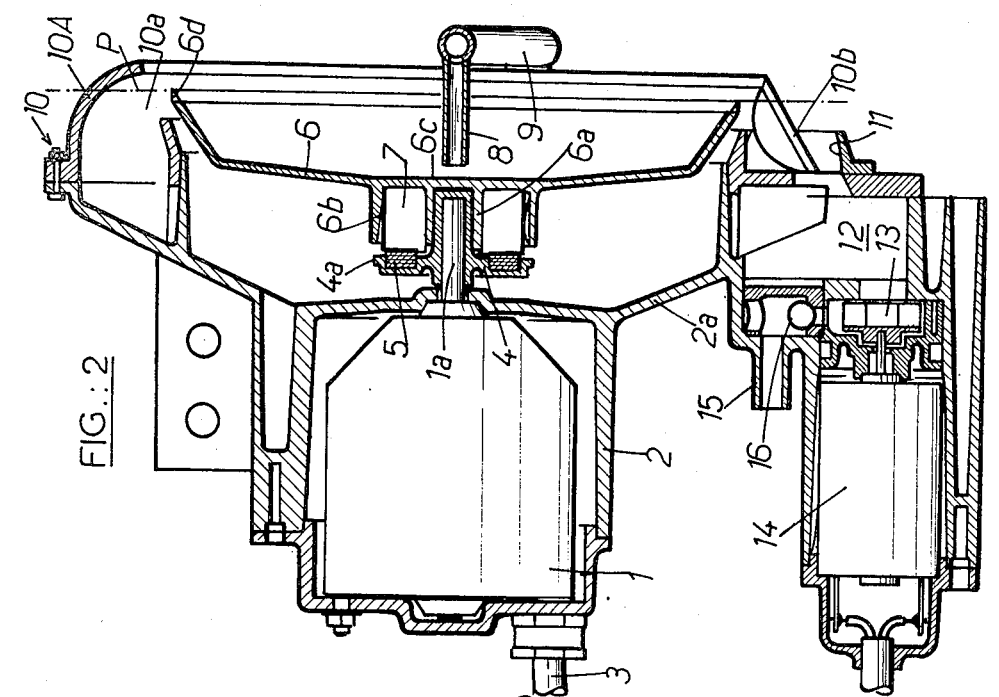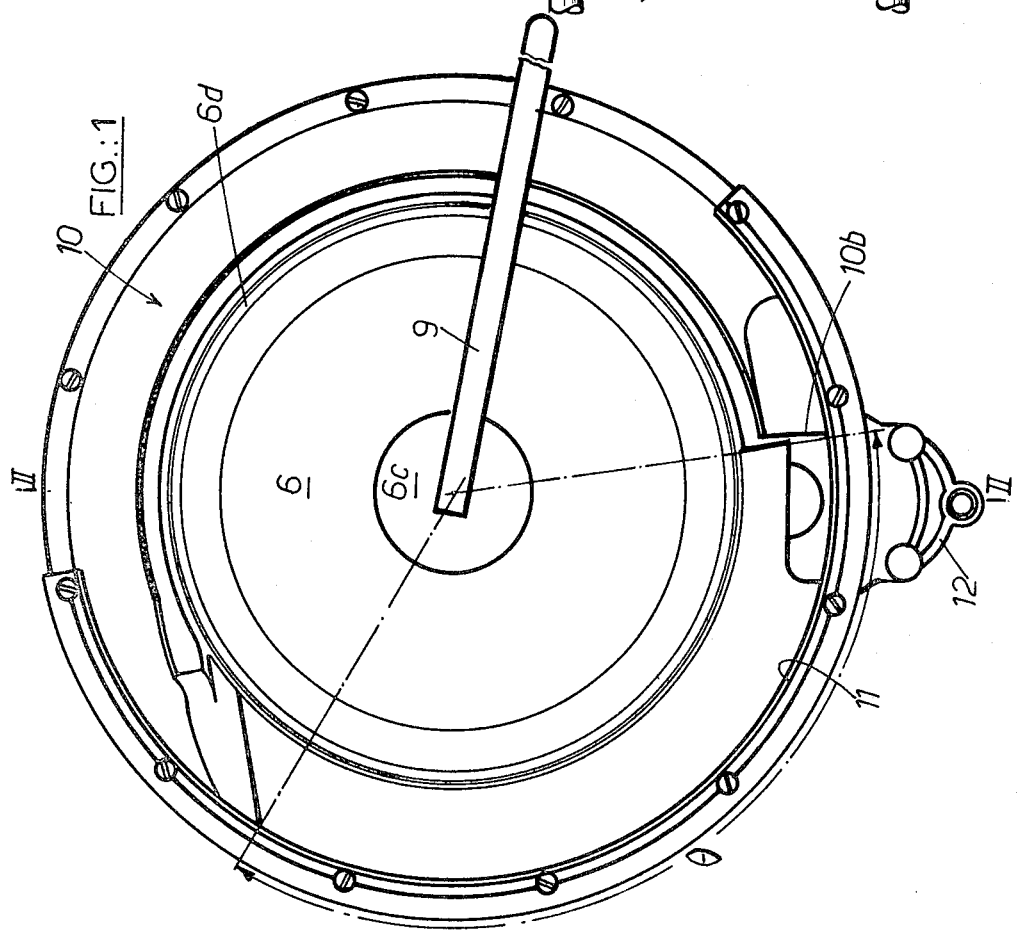

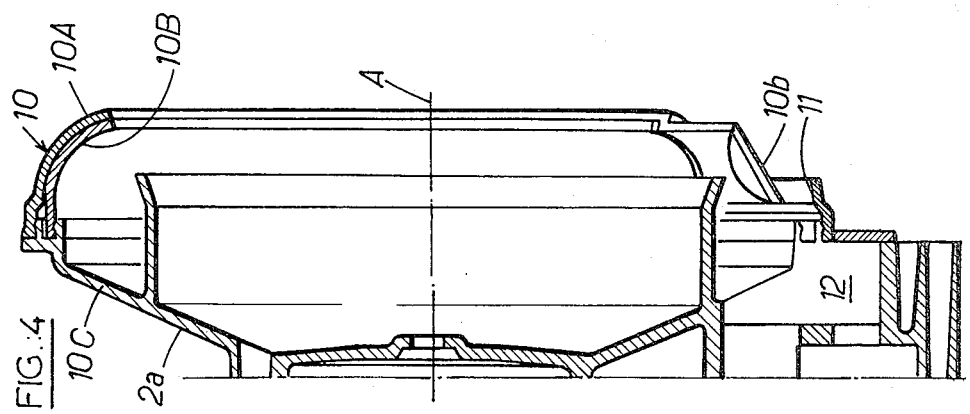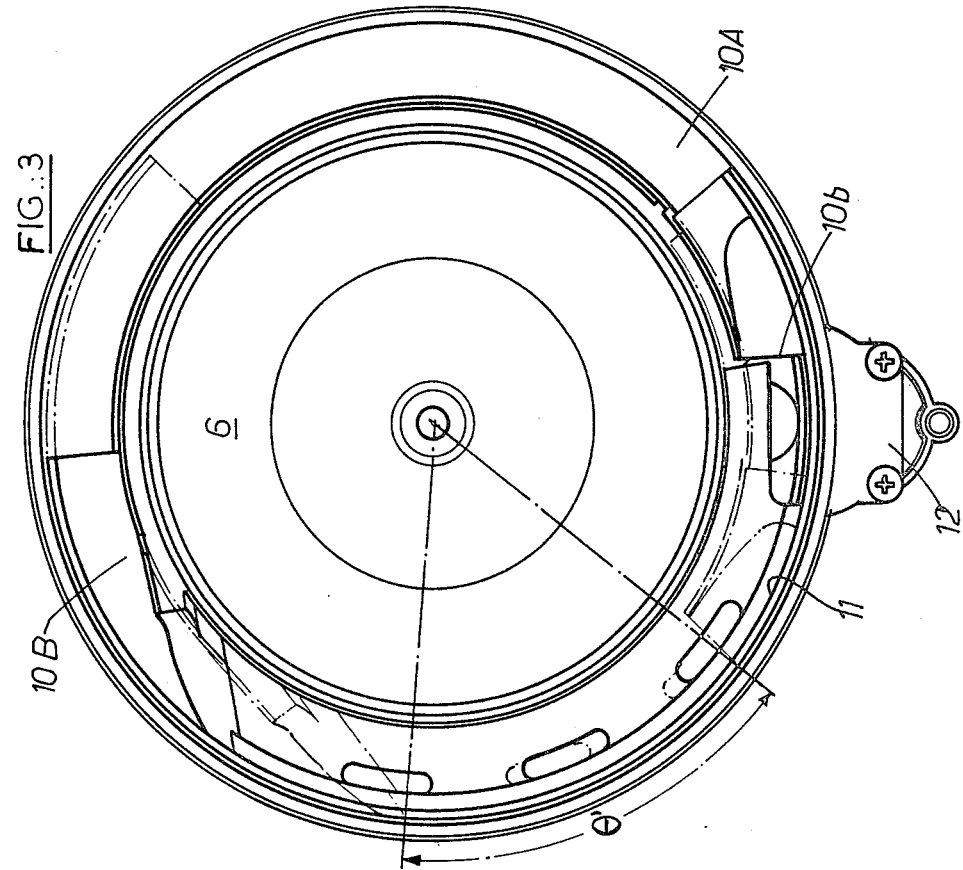

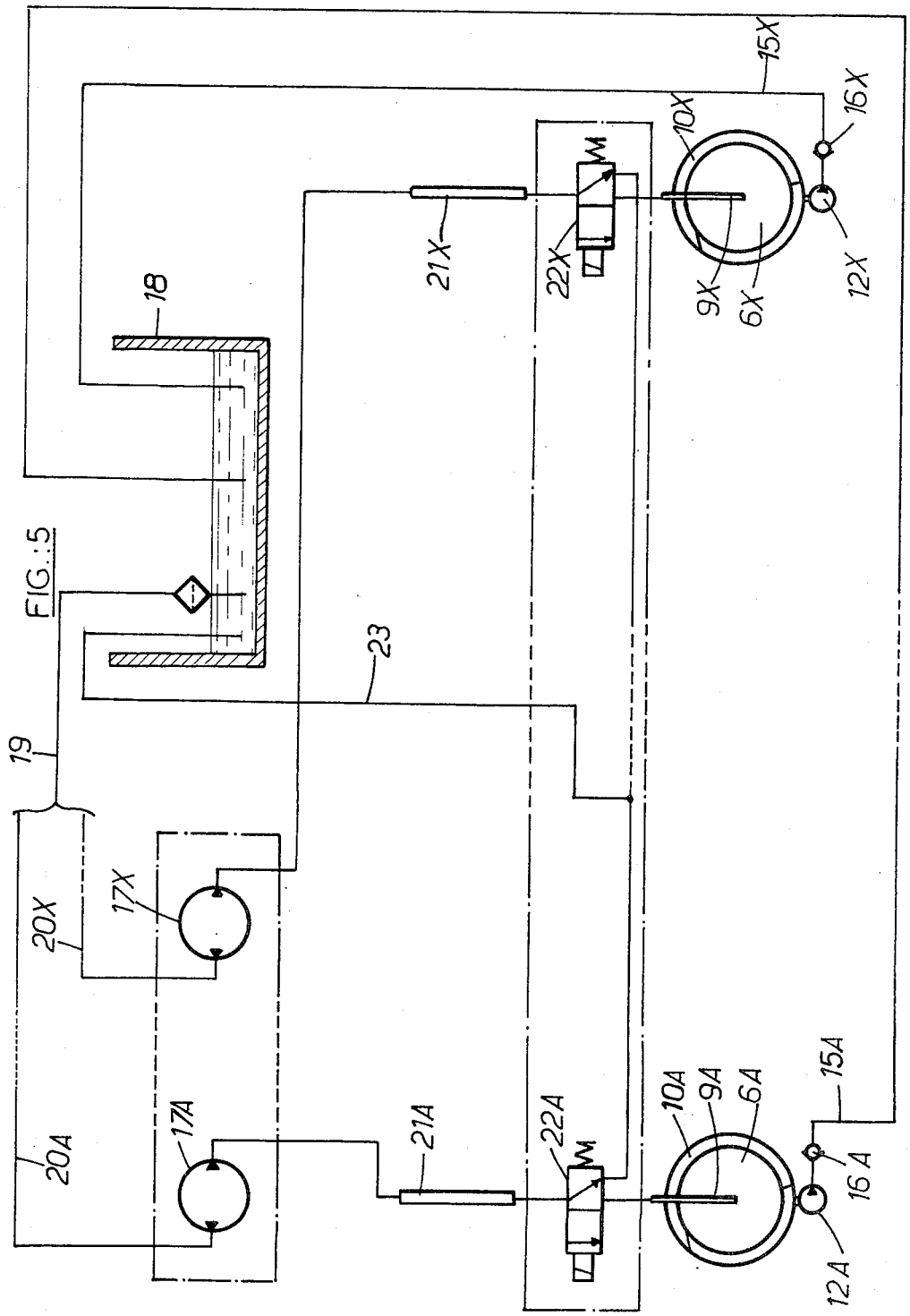

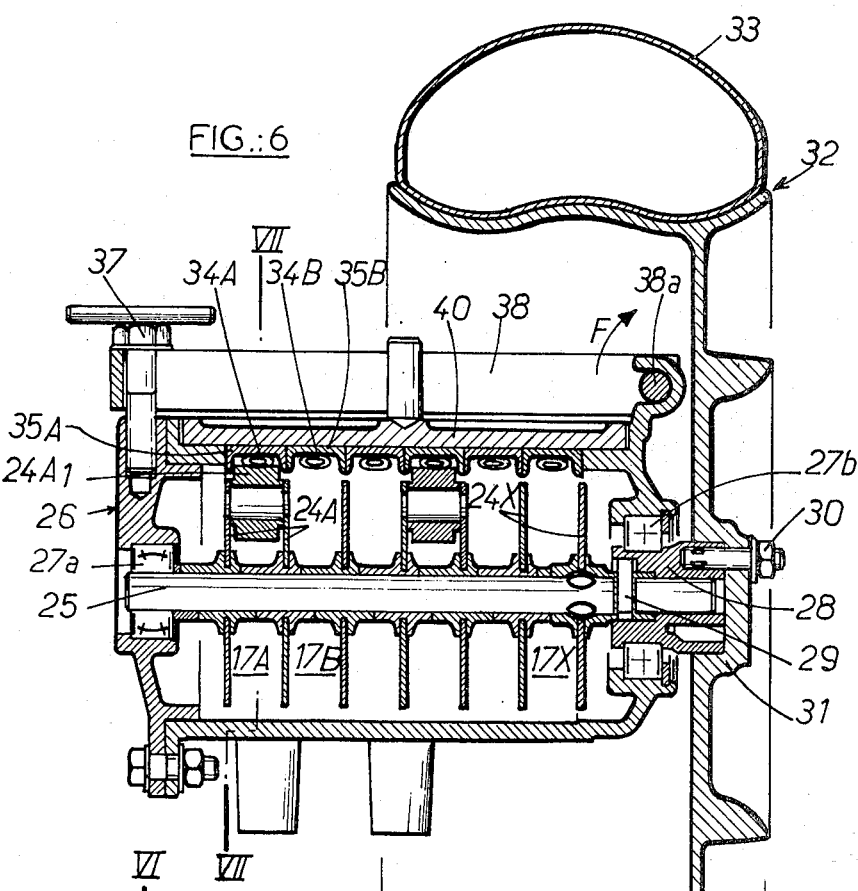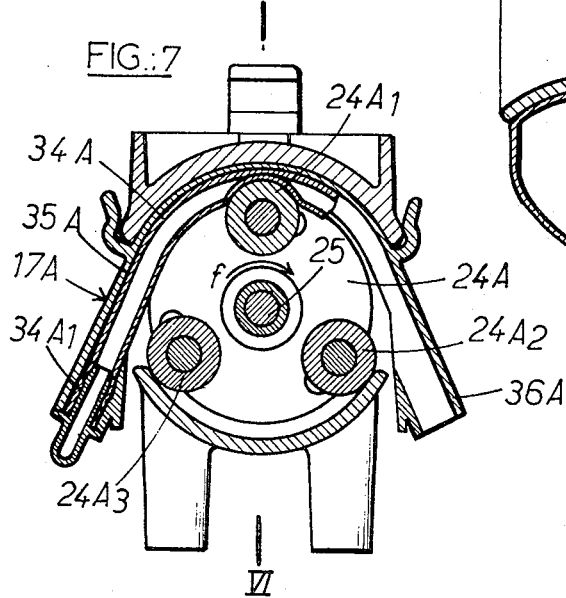

4,473,188

MACHINE FOR SPRAYING A TREATMENT LIQUID, ESPECIALLY FOR THE TREATMENT OF PLANTS AND SOILS

This application is a continuation, of application Ser. No. 293,128, filed Aug. 17, 1981, now abandoned.

BACKGROUND OF THE INVENTION

1. Field of the Invention

The present invention relates generally to a machine for spraying a treatment liquid, and especially one for the treatment of plants and soils.

2. Description of the Prior Art

Several types of mobile spraying machines are widely employed in agriculture as well as for the treatment of trees and vines. These machines perform satisfactorily when the volume of liquid which must be scattered per unit area is relatively high. But certain treatments necessitate the scattering of a relatively small volume of liquid per unit area. In order to reduce the delivery of liquid projected by each nozzle of such a machine it obviously is sufficient to reduce the diameter of the nozzle. But a limit is rapidly reached in this direction, especially in the case of the scattering of liquids which carry treating particles. Considerable risks arise regarding obstruction of the nozzles.

SUMMARY OF THE INVENTION

The spraying machine in accordance with the present invention offers the important advantage of enabling small amounts of treatment liquid to be scattered per unit area, especially amounts less than or equal to 40 liters per hectare.

The machine in accordance with the present invention comprises at least one rotary thrower against the central portion of which a nozzle projects the liquid which is to be sprayed and which is drawn by a pump from a tank. One most important feature of this machine consists in that a collector in the form of a sector of a ring, of fixed or adjustable angle, is fixed along the periphery of the rotary thrower without contact with it, so as to intercept the sprayed liquid over the corresponding sector, and that means are provided for returning the liquid collected by the collector to the tank of treatment liquid.

Use of such nozzle enables the reduction of the volume of liquid projected by each rotary thrower per unit of time, simply by an appropriate choice of the angle covered by the collector in the form of a sector of a ring, without there resulting any loss of liquid, since the droplets of liquid intercepted by the said collector and collected by it, are returned to the tank of treatment liquid. Thus especially for a treatment with weedkiller one may employ, for example, an annular collector of 220 degrees, which allows spraying only over an angle of 140 degrees, or else an annular collector of 330 degrees, which allows spraying only over an angle of 30 degrees for localized applications.

It is of course possible to employ the same spraying machine with collectors of different or adjustable angles, the installation and the removal or adjustment of which may be done very easily by simple mechanical means. However, in a preferred embodiment of the invention the collector includes two components, each in the form of a sector of a ring, of which at least one may be mounted so as to be displaceable coaxially with the corresponding rotary thrower, while the other component of the collector may be fixed. Such a collector in two components enables very easy adjustment, for example, by hand, of the angle of the sector of a ring formed by its two annular components, between a minimum value and a maximum value which may be not much less than 360 degrees in order to enable localized application.

An adjustment of the diameter of the droplets of sprayed liquid may also be obtained in accordance with another feature of the invention, by having each rotary thrower driven by a variable-speed motor, for example, an electric motor associated with a rheostat for variation of its speed. Thus such an arrangement allows the number of droplets of liquid scattered per square centimeter to be adjusted.

Hence the present invention enables mobile spraying machines having a number of rotary throwers to be realized, for agriculture and especially for low crops. The same mobile machines in accordance with the present invention may easily be adapted for the treatment of trees and vines by providing one or more blowers which produce a stream of air directed so as to carry the liquid sprayed by each rotary thrower in the direction of the plants which are to be treated.

It is known that mobile spraying machines of this species scatter a substantially constant volume of liquid per unit of time, with the result that variations in their speed of travel appear as corresponding variations in the volume of liquid scattered per unit area.

One embodiment of the present invention offers, however, the important advantage of enabling the scattering of a constant volume of liquid per unit area in spite of variations in the speed of travel of the mobile spraying machine. This embodiment is featured so that the rotary throwers are fed respectively by peristaltic pumps the rotors of which are keyed onto a common shaft coupled to the hub of a driving roller, for example, a roller having a pneumatic tire which is partially inflated or not at all, the roller being applied against the periphery of one wheel of the mobile machine or of the vehicle carrying and/or pulling it.

As practically no slipping is produced between the driving roller having a pneumatic tire which is inflated only partially, and the wheel of the machine or of the corresponding vehicle, against the periphery of which the roller is applied, as well as between this wheel and the ground, this arrangement in accordance with the present invention ensures almost proportionality between the volumetric flow from each peristaltic pump and the speed of travel of the machine, whence results a practically constant scattered volume per unit of distance travelled by the mobile machine and consequently per unit of area treated.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

FIGS. 1 and 2 are respectively a front view and a section through an axial plane of a first embodiment of one of the rotary throwers with which a spraying machine in accordance with the present invention may be equipped.

FIGS. 3 and 4 are corresponding views of a second embodiment, FIG. 4 being simplified in order to show only the collector associated with a rotary thrower which is not shown.

FIG. 5 is the hydraulic diagram of an embodiment of a mobile spraying machine in accordance with the present invention, which enables the scattering of a constant volume of liquid per unit area in spite of variations in its speed of travel.

FIG. 6 is a section through an axial plane of the system of peristaltic pumps with which the embodiment of FIG. 5 is provided, as well as the driving roller of this system of pumps.

FIG. 7 is a section along the line VII—VII in FIG. 6.

DETAILED DESCRIPTION OF THE PREFERRED EMBODIMENTS

In FIGS. 1 and 2, 1 designates an electric motor which is housed in a casing 2 and which receives its electric supply through a cable 3 passing through the casing 2; known means (not shown) are provided in order to enable the speed of rotation of the electric motor 1 to be adjusted with accuracy; it may be a question of a regulating rheostat (not shown) or of electronic speed regulating circuits well known to those skilled in the art, which it is therefore unnecessary to describe in detail. Onto the end 1*a* of the shaft of the motor 1 which leaves the casing 2 is fixed a collar 4, for example, of moulded synthetic matter, which is integral with a plate 4*a* perpendicular to the shaft end 1*a*, or with radial parts each including on the face of it remote from the casing 2 a hollow in which is fixed a permanent magnet 5. The rotary thrower 6 exhibits in this embodiment the shape of a not very deep cup the bottom of which is integral with a first cylindrical part 6*a* which can be slipped over the corresponding end of the collar 4, as well as with a second cylindrical part 6*b* of inside diameter slightly greater than that of the cylindrical surface within which are inscribed the permanent magnets 5; an annular metallic ring 7 is fixed between the two cylindrical parts 6*a* and 6*b* so that its left hand face (in FIG. 2) comes into contact with the permanent magnets 5. This annular ring 7 consists preferably of soft iron. The device which has just been described ensures coupling of the rotary thrower 6 with the end 1*a* of the shaft of the motor 1 under conditions which enable very rapid withdrawal and return to place of the rotary thrower 6. Facing the central portion 6*c* of the face of the rotary thrower 6 remote from the motor 1 a cylindrical nozzle 8 opens out; a pump (not shown), for example, a pump having constant volumetric delivery, draws from a tank the liquid which is to be atomized and delivers it into the nozzle 8 by way of a pipe 9.

In accordance with the present invention the casing 2 which envelops the motor 1 is extended next to the rotary thrower 6 by a frustoconical collar 2*a* the periphery of which is integral with a collector 10. In the embodiment being considered, collector 10 has the shape of a substantially toroidal gutter of cross-section nearly closed except for a narrow annular slit 10*a* at the level of the plane P (in dash-dot line in FIG. 2) which is perpendicular to the axis of the rotary thrower and which passes through the outer edge 6*d* of the said thrower 6. As may be seen in FIG. 1, the collector 10 has the form of a sector of a ring of an angle equal to (360°-$\theta$) so as to expose the outer edge 6*d* of the rotary thrower 6 in the plane P only over the angle $\theta$. The lowest portion 10*b* of the annular collector 10 opens out above a channel 11 which in turn leads into a recovery receiver 12.

The jet of liquid leaving the nozzle 8 strikes against the central portion 6*c* of the rotary thrower 6, so becoming atomized. Centrifuged force makes the droplets of atomized liquid migrate towards the outer edge 6*d* of the thrower 6 which projects the droplets substantially along the plane P. All of the droplets projected at the level of the annular collector 10 enter its toroidal gutter through the slit 10*a* and then flow by gravity down to the lowest portion 10*b* of it and there the liquid collected by the collector 10 flows into the receiver 12 through the channel 11. Only those droplets of atomized liquid are employed for the treatment, which the outer edge 6*d* of the rotary thrower 6 projects at the level of the fixed sector of angle $\theta$ exposed by the annular collector 10. The liquid collected in the receiver 12 is returned from it into the tank (not shown) by the action of a small centrifugal pump 13 which is driven by an electric motor 14 and which delivers the liquid into a return pipe 15 at the inlet to which is inserted a non-return valve 16. Value 16 prevents upon stopping the centrifugal pump 13, the liquid contained in the return pipe 15 from flowing back into the receiver 12.

In the variant illustrated diagrammatically and partially in FIGS. 3 and 4 the collector 10 or at least the portion of it situated opposite the frustoconical collar 2*a* includes two components in the form of a sector of a ring, 10A and 10B, which are mounted so as to be displaceable concentrically about the axis A of the rotary thrower with respect to one another as well as with respect to the fixed portion 10C of the collector 10, which is integral with the frustoconical collar 2*a*. As in the embodiment as in FIGS. 1 and 2 the lowest portion 10*b* of the annular collector 10 and especially of its component 10A opens above the channel 11 which ends in the receiver 12 serving for the recovery of the liquid.

In FIG. 3 in solid line the positions are shown of the two movable components 10A and 10B of the annular collector 10, which correspond with its maximum opening, that is to say, to an angle of projection of the liquid close to the angle $\theta$ indicated in FIG. 1. In the same FIG. 3 the positions have been indicated in dash-dot line of the displaceable components 10A and 10B of the annular collector 10, which correspond with a smaller opening of the collector, that is to say, with an angle of atomization $\theta'$, less than the maximum angle $\theta$. Hence this arrangement in accordance with the present invention enables the angle $\theta$ of atomization to be adjusted between a maximum value and a minimum value which may be still less than $\theta'$ (FIG. 3) and in particular as small as 10° or 15°. Such small values of the atomization angle $\theta$ obviously enable scattered volumes to be obtained which are significantly less than 20 liters/hectare. It will be recalled that variation of the speed of the electric motor 1 (FIG. 2) enables the diameter of the droplets of atomized liquid to be regulated.

FIG. 5 is the hydraulic diagram of a mobile spraying machine in accordance with the present invention, which is equipped with a certain number of rotary throwers, 6A to 6X, each equipped with an annular collector, 10A to 10X, of one of the types illustrated in FIGS. 1 to 4 and previously described. This machine includes a number of pumps, 17A to 17X which draw the liquid which is to be atomized from a receiver 18 by way of pipes 19 and 20A to 20X; the pumps 17A to 17X respectively deliver the liquid which is to be atomized into the pipes 9A to 9X, feeding the nozzles (not shown)

of the several rotary throwers 6A to 6X by way respectively of expansible sleeves 21A to 21X of known type intended to serve as flow regulators, and solenoid control valves 22A to 22X. Each of the solenoid valves 22A to 22X is of known type having a rest position (represented in FIG. 5) in which the corresponding pump, for example, 17A delivers into a common return pipe 23 ending in the tank 18, and a working position in which the corresponding pump delivers into the pipe 9A previously mentioned. The receivers for recovery of the liquid, 12A to 12X, which are associated respectively with the collectors 10A to 10X of the throwers 6A to 6X are connected to the tank 18 respectively by pipes 15A to 15X in which are inserted non-return valves 16A to 16X as has been described previously with respect to FIG. 2.

In the embodiment of the invention of which FIG. 5 reproduces the hydraulic diagram, each of the pumps 17A to 17X associated respectively with the rotary throwers 6A to 6X, is a peristaltic pump realized, for example, as illustrated in FIG. 7. On the other hand the several peristaltic pumps 17A to 17X have their rotors such as 24A keyed onto a common shaft 25 the ends of which are mounted to turn freely in a casing 26 by way of ball or roller bearings 27a and 27b; in fact, the bearing 27b is that of a shaft end 28 of the face of which inside the casing 26 is coupled to the corresponding end of the common shaft 25 by way of a freewheel or ratchet mechanism 29, while its face outside the casing 26 is coupled, in particular by bolts such as 30, to the hub 31 of a driving roller 32. In the embodiment being considered, the driving roller 32 is provided with a pneumatic tire 33, preferably inflated only a little or not at all, and the assembly of the casing 26, the shaft 25 and the hub 31 of the roller 32 is carried in a manner in itself known, by an oscillating arm so that the tire 33 of the roller 32 is applied, for example, by the weight of the assembly, against the periphery of a wheel (not shown) of the mobile atomization equipment or else of the vehicle which is carrying it, or which is pulling it if it is itself equipped with bearer members.

In accordance with the present invention, each peristaltic pump such as 17A or 17B includes a deformable tube component such as 34A or 34B, for example, of extruded synthetic matter and of oval cross-section as may be seen in FIG. 6; the deformable tube component such as 34A of each pump such as 17A is placed in a removable case such as 35A, to which the tube component 34A is locked, for example, by one end 34A1 (FIG. 7); each of the cases 35A exhibits in section through a plane perpendicular to the common shaft 25 the form which may be seen in FIG. 7; it may in addition be clearly seen in FIG. 6 that each case such as 35A or 35B exhibits next to the common shaft 25 an opening for passing through the portions of the rotor such as 24A of the corresponding peristaltic pump, which are intended for the local squeezing of the tube component 34A; in the embodiment illustrated the rotor such as 24A of each peristaltic pump consists essentially of two discs fixed perpendicularly to the common shaft 25 by collars threaded onto the latter, and of three squeezer rollers 24A1 to 24A3 mounted between the two discs of the corresponding rotor 24A so as to form beyond the cylindrical surface enveloping the two discs, projections of sufficient width for producing the at least partial squeezing of the deformable tube component 34A in the portion of it located towards the center of the corresponding case 35A as may be seen in FIG. 7.

When the mobile spraying machine in accordance with the present invention is in progress, for example, following its tractor vehicle (not shown), the wheel of the equipment or of this vehicle against the periphery of which the pneumatic tire 33 of the driving roller 32 is applied, drives the latter in rotation and the sense of the freewheel 29 has been chosen such that the hub 31 of the roller 32 drives the common shaft 25 in rotation, upon which are keyed the rotors of all of the peristaltic pumps. At each revolution of the roller 32 the rollers such as 24A1 to 24A3 carried by the rotors such as 24A of the several peristaltic pumps, squeeze three times in succession the cross-section of the corresponding deformable tube component 34A, which has the effect each time of causing the corresponding roller to deliver the amount of liquid for atomization, which is contained in the downstream portion of the tube component 34A (with respect to the direction of rotation indicated by the arrow f in FIG. 7), in the direction of the outlet pipe stub 36A (FIG. 7) which is, for example, moulded in one with the corresponding case 35A. The delivery from each peristaltic pump such as 17A is regulated by the corresponding expansible sleeve 21A and better regularity of the scatter with respect to time may be obtained by offsetting by, for example, 120 degrees, the rollers of the rotors of two successive peristaltic pumps, for example, 17A and 17B, as may be seen in FIG. 6.

In the absence of slipping between on the one hand the roller 32 and the wheel against the periphery of which it is applied, and on the other hand between the latter and the ground, the instantaneous speed of rotation of the rotors such as 24A of the peristaltic pumps such as 17A is proportional to the speed of travel of the mobile atomization equipment, which ensures at least approximate constancy of the volume of liquid scattered per unit area, in spite of the variations in the speed of travel which are inevitable in particular over uneven ground.

If the mobile spraying machine previously described is moved backwards, the freewheel 29 prevent the roller 32 communicating its rotation to the common shaft 25 and the latter consequently driving in rotation the rotors of the several peristaltic pumps.

Of course the cross-section of each of the deformable tube components such as 34A must be adapted to the volume of liquid which must be scattered per unit area, whatever the speed of travel of the atomization equipment and consequently of the driving roller 32. The replacement of the deformable tube components such 34A by tube components of different cross-section is rendered easy by the fact that it only necessitates the removal of the corresponding removable case such as 35A to which there may possibly be locked one of the ends of the deformable tube component 34A; as may be seen in FIG. 6 the removal of one or more of the cases such as 35A necessitates only the unscrewing of the bolts such as 37, which then enables the upper closure plate 38 to be made to pivot about the pin 38a in the direction of the arrow F and finally the cases to be released by removal of the plate 40.

The same operations also enable the replacement of one of the deformable tube components in the event of deterioration, for example, from wear, or in the case of obstruction.

The present invention is not restricted to the embodiments previously described. It embraces any variants upon them. The realization of each of the peristaltic pumps is a matter of choice, similarly their driving at an instantaneous speed which is always proportional to the speed of travel of the mobile equipment. In the case of the collector illustrated in FIGS. 3 and 4 and previously described, the displacement of its two movable components 10A and 10B enables variation to be effected not only of the scatter angle θ or θ', but also of the mean direction of scatter, along the periphery of the thrower—this direction corresponding substantially with the bisector of the angle θ' in FIG. 3. Even in the case of a collector which defines a fixed spraying angle θ (FIG. 1) it is possible to make the portion 10A (FIG. 2) of this collector displaceable coaxially with the thrower 6 so as to be able to displace the mean direction of spraying along the periphery of the thrower. Of course in the case of the adjustable collector illustrated in FIGS. 3 and 4, one of its two components 10A or 10B may be fixed and possibly integral with its fixed portion 10C, the adjustment then being obtained by displacing only its other component, 10B or 10A.

Obviously, numerous modifications and variations of the present invention are possible in light of the above teachings. It is therefore to be understood that within the scope of the appended claims, the invention may be practiced otherwise than as specifically described herein.

I claim:

1. An apparatus adapted to be movably supported above a surface soil for spraying a treatment liquid for the treatment of said soil or of plants on said soil, comprising:
   a shaft rotatably mounted to said apparatus;
   at least one nozzle operatively associated with said apparatus;
   a tank of treatment liquid mounted to said apparatus;
   means for supplying said at least one nozzle with said treatment liquid from said tank;
   at least one thrower mounted to said apparatus to rotate with said shaft in substantially one plane inclined with respect to said soil to impart a vertical component of force to said treatment liquid for accurately spraying said treatment liquid, and wherein said at least one thrower faces said at least one nozzle;
   motor means for driving said shaft and for driving said at least one thrower such that said at least one thrower uniformly sprays said treatment liquid within said one plane;
   means for intercepting said treatment liquid sprayed from said thrower so as to form a single flat sector-shaped sprayed liquid jet directed toward said soil by said vertical component of force along said one plane and included within an angle θ, wherein said means for intercepting intercepts said treatment liquid over an angle of (360-θ); and
   means for returning said treatment liquid intercepted by said means for intercepting to said means for supplying said at least one nozzle with said treatment liquid.

2. An apparatus as in claim 1, wherein said means for intercepting said treatment liquid comprises at least one first ring sector-shaped member disposed about a peripheral portion of said thrower in a coaxially displaceable, contact free relationship with said thrower for angularly adjusting a mean direction of said single flat sector-shaped jet of said treatment liquid in relation to said soil.

3. An apparatus as in claim 2, wherein said means for intercepting said treatment liquid further comprises a second ring sector-shaped member disposed about a peripheral portion of said thrower in a fixed or coaxially displaceable contact free relationship with said thrower for adjusting the angle θ of said single flat sector-shaped jet of said treatment liquid.

4. An apparatus as in claim 1, wherein said thrower is mounted to rotate in a plane substantially perpendicular to the soil.

5. An apparatus as in claim 1, further comprising a pump inserted between said tank and said means for supplying said at least one nozzle.

6. An apparatus as in claim 1, wherein a first side of said thrower is mounted on one end of said rotatable shaft, and said at least one nozzle is disposed in front of a central part of a second side of said thrower.

7. An apparatus as in claim 1, wherein said motor means for driving said shaft and said at least one thrower comprises a variable-speed motor.

8. An apparatus adapted to be movably supported above a surface soil for spraying a treatment liquid for the treatment of said soil or of plants on said soil, comprising:
   a shaft rotatably mounted to said apparatus;
   at least one nozzle operatively associated with said apparatus;
   a tank of treatment liquid mounted to said apparatus;
   means for supplying said at least one nozzle with said treatment liquid from said tank;
   at least one thrower mounted to said apparatus to rotate with said shaft in substantially one plane inclined with respect to said soil to impart a vertical component of force to said treatment liquid for accurately spraying said treatment liquid, such that said at least one thrower faces said at least one nozzle;
   motor means for driving said rotatable shaft and for driving said at least one thrower such that said at least one thrower uniformly sprays said treatment liquid within said one plane;
   a collector member mounted to said apparatus and having an upper portion and a lower portion, said upper and lower portions being disposed about a peripheral portion of said thrower and free from contact with said thrower; and
   means for returning said treatment liquid from said lower portion of said collector member to said means for supplying said at least one nozzle with said treatment liquid, wherein said upper portion of said collector member comprises a ring sector form bounded within an angle of (360-θ) for exposing said peripheral portion of said thrower within an angle θ such that said treatment liquid sprayed from said thrower is intercepted by said upper portion of said collector member over an angle of 360-θ, such that a single flat sector-shaped jet of said treatment liquid is exclusively sprayed within said angle θ towards said soil by said vertical component of force along said one plane, and such that said treatment liquid intercepted by said upper portion of said collector member flows by gravity to said lower portion of said collector member.

9. An apparatus for spraying a treatment liquid particularly for the treatment of soil or of plants on said soil, comprising:
   a shaft rotatably mounted to said apparatus;
   at least one nozzle operatively associated with said apparatus;

means for supplying said at least one nozzle with said treatment liquid;

at least one thrower adapted to rotate with said shaft in substantially one plane, such that said at least one thrower faces said at least one nozzle;

motor means for driving said rotatable shaft and for driving said at least one thrower such that said at least one thrower uniformly sprays said treatment liquid within said one plane;

a collector member having an upper portion and a lower portion, said upper and lower portions being disposed about a peripheral portion of said thrower and free from contact with said thrower;

a receiver for the liquid intercepted by said collector member, said receiver being disposed so that the lower portion of said collector member opens into said receiver;

means for returning said treatment liquid from said receiver to said means for supplying said at least one nozzle with said treatment liquid, wherein said collector member comprises an arcuate-shaped cross-section nearly closed except for a slit arranged opposite said peripheral portion of said thrower, and wherein said upper portion of said collector member comprises a ring sector form bounded within an angle of $(360-\theta)$ for exposing said peripheral portion of said thrower within an angle $\theta$, such that said treatment liquid sprayed from said thrower is intercepted by said upper portion of said collector member over an angle of $360-\theta$, such that a single flat sector-shaped jet of said treatment liquid is exclusively sprayed within said angle $\theta$ along said one plane, and such that said treatment liquid intercepted by said upper portion of said collector member flows by gravity to said lower portion of said collector member and to said receiver.

10. An apparatus as in claim 9, wherein said upper portion of the collector member comprises at least one first ring sector-shaped member mounted in a coaxially displaceable relationship with said thrower for angularly adjusting the mean direction of said single sector-shaped jet of said treatment liquid in relation to said soil.

11. An apparatus as in claim 10, wherein said collector member further comprises a second ring sector-shaped member mounted in a fixed or coaxially displaceable relationship with said thrower for adjusting the angle $\theta$ of said single sector-shaped jet of said treatment liquid.

12. An apparatus as in claim 9, further comprising a pump inserted between said receiver and said nozzle supplying means.

13. An apparatus as cin claim 9, wherein a first side of said thrower is mounted on one end of said rotatable shaft, and said nozzle is disposed in front of a central part of a second side of said thrower.

14. An apparatus as in claim 9, wherein said motor means for driving said shaft and said thrower comprises a variable-speed motor.

15. An apparatus as in claim 9, further comprising a tank filled with said treatment liquid, said tank being inserted between said means for supplying the nozzle with treatment liquid and said means for returning said liquid from said lower portion of said collector member.

* * * * *